June 16, 1942.     O. W. JOHNSON     2,286,912
MOUSE TRAP
Filed June 30, 1941
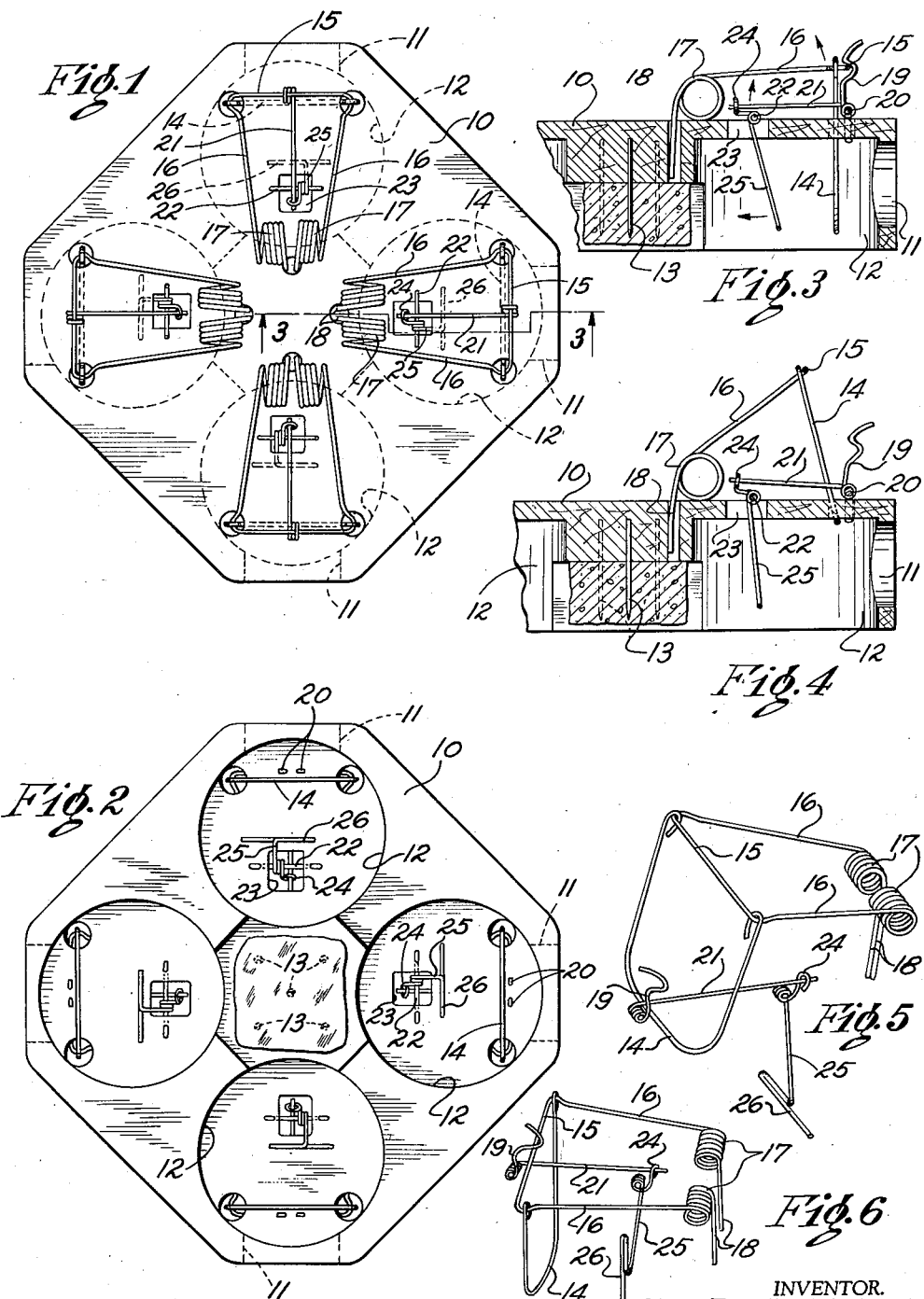
INVENTOR.
OLIVER WARREN JOHNSON
BY Richey & Watts
ATTORNEYS Patented June 16, 1942

2,286,912

UNITED STATES PATENT OFFICE 2,286,912

MOUSETRAP

Oliver Warren Johnson, Geneva, Ohio, assignor of one-half to Jay Carleton Kelley, Geneva, Ohio Application June 30, 1941, Serial No. 400,432

2 Claims. (Cl. 43—86)

This invention relates to traps of the type employed in catching and destroying rodents and similar animals.

One of the objects of the invention is to provide a latching mechanism which is designed so that the trap setting operation can be effected through the single movement exercised in adjusting the choke wire spring.

Another object of the invention is to provide a latch tripping mechanism which is organized to afford sufficient mechanical advantage to facilitate the operation of the choke wire spring under application of the slightest pressure upon the trip arm.

Another object of the invention is to provide a trap which is designed to facilitate the ejection of the body of the animal from the trap without the necessity of handling or even touching the animal's body.

Another object of the invention is to construct a mouse trap which may be set without danger of injury to the fingers of the person handling the trap.

Another object of the invention is to provide a mouse trap which is economic of manufacture, sturdy of structure and reliable of operation.

Other objects and advantages more or less ancillary to the foregoing and the manner in which all the various objects are realized will appear in the following description, which considered in connection with the accompanying drawing, sets forth the preferred embodiment of the invention.

Fig. 1 is a plan view of the improved trap;

Fig. 2 is a bottom view of the trap shown in Fig. 1;

Fig. 3 is a vertical section through a portion of the trap showing the choke wire and latch adjusted in their operative positions, the section being taken on the plane indicated by line 3—3 in Fig. 1;

Fig. 4 is a similar sectional view of the portion of the trap shown in Fig. 3, the choke wire, latch and trip being illustrated in their actuated or released position;

Fig. 5 is a perspective view, shown somewhat diagrammatically, illustrating the relation of the spring and trip in their released or free position; and Fig. 6 is a similar view in perspective showing the relation of the spring and trip when the spring is adjusted in its latched position.

As illustrated in Fig. 1 the trap comprises a body 10 formed from a wooden block, as shown, or from a sheet metal stamping which is fabricated with openings 11 in the side walls thereof, recesses or chambers 12 communicating therewith and a plurality of pins or prongs 13 in the center of the body for the retention of the bait. The upper face of the trap is apertured adjacent the openings 11 for the reception of the arms of a choke wire 14 which, as may be more clearly seen in Figs. 5 and 6, are provided with eyes engaged with a loop 15 uniting the spring arms 16. The inner ends of the arms 16 are coiled to form helical springs 17 provided with depending tongues 18 which are anchored in apertures formed in the top of the body 10. As shown in Fig. 3 the springs 17 are retained in their stressed position by the engagement of a latch hook 19 with the spring loop 15. The latch in its entirety comprises a bell crank fulcrumed upon a staple 20 mounted in the top of the body 10. The arms of the bell crank are proportioned in the ratio of approximately four to one, the length of the shorter arm being determined by the dimension from the fulcrum to the latch hook 19. The inner arm 21 of the bell crank constitutes a straight rod extending rearwardly and terminating at a point adjacent the center of the body 10. The latch trip is likewise configured in the form of a bell crank fulcrumed upon the staple 22 spanning an opening 23 in the upper face of the body. The upper arm 24 of the trip is provided with an eye which is engaged with the inner arm 21 of the bell crank latch. The lower arm 25 of the trip is extended through the opening 23 and may terminate, as shown, with a laterally extended end portion 26 or may be formed with a loop or series of loops arranged to obstruct the passageway leading from the opening 11 to the bait. The ratio between the length of the arms 24 and 25 is designed similar to the ratio between the arms of the bell crank latch in order to minimize the effort required to actuate the arm 21.

In operation after the bait has been pressed upon the pins 13 the spring arms 16 are depressed until the loop 15 is brought into engagement with the latch hook 19, whereupon the bell cranks forming the latch and the trip will automatically swing into their operative position with the choke wire depressed as shown in Fig. 1. With the multiplied leverage afforded through the bell crank trip and the further multiplied leverage afforded through the bell crank latch it is readily apparent that the latch hook 19 may be released upon the application of the slightest pressure against the arm 25 notwithstanding the effort and frictional resistance offered by the spring. When the trap is set the animal, in its effort to reach the bait, will enter the opening 11, push the obstructing trip arm 25 rearwardly, which in turn will actuate the latch bell crank and cause the release of the spring and consequent elevation of the choke wire 14.

After the animal is caught by the elevation of the choke wire 14 removal of the body of the animal may be readily effected by merely depressing the arms 16 of the spring until the choke wire is lowered to a position where the body will fall from the trap by gravity.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A mouse trap comprising a hollow body having an opening in a side wall thereof, a bait pin in the center of said body, a choke wire within said body adjacent said opening, a spring connected thereto, a cross member formed in said spring, a bell crank constituting a trip member, a pivot therefor mounted on the top of said body, a long arm forming a portion of said bell crank depending within said body, a short arm forming another portion of said bell crank extended inwardly toward said bait pin, an eye in an upturned end of said short arm, a second bell crank constituting a latch, a pivot therefor mounted in the top of said body, a long arm forming a portion of said latch bell crank extended inwardly with the free end thereof loosely engaged within said eye, a short arm forming another portion of the latch bell crank disposed in a vertical plane and normal to the latch long arm, a hook in the end portion of the latch short arm, a shoulder formed by said hook, said spring cross member and said latch pivot being arranged in a common vertical plane whereby the full load of the spring is imposed upon the latch pivot when said latch hook is engaged, and whereby the free end of the trip bell crank is free to move within the limits of the clearance between said arm and said eye.

2. A mouse trap comprising a hollow body having an opening in a side wall thereof, a bait pin in the center of said body, a choke wire within said body adjacent said opening, a spring connected thereto, a cross member formed in said spring, a bell crank constituting a trip member, a pivot therefor mounted on the top of said body, a long arm forming a portion of said bell crank depending within said body and inclined forwardly towards the opening in the side wall of the body, a transverse bend in the end portion thereof, a short arm forming another portion of said bell crank extended inwardly toward said bait pin, an eye in an upturned end of said short arm, a second bell crank constituting a latch, a pivot therefor mounted in the top of said body, a long arm forming a portion of said latch bell crank extended inwardly with the free end thereof loosely engaged within said eye, a short arm forming another portion of the latch bell crank disposed in a vertical plane and normal to the latch long arm, a hook in the end portion of the latch short arm, a shoulder formed by said hook, said spring cross member and said latch pivot being arranged in a common vertical plane whereby the full load of the spring is imposed upon the latch pivot when said latch hook is engaged, and whereby the initial inward thrust against the trip arm or a downward thrust upon the transverse bend therein will elevate the long arm of the latch bell crank and effect the inclination of the shoulder in the hook and the spring will urge further movement of the latch and the release thereof.

OLIVER WARREN JOHNSON.